United States Patent [19]

Kurosawa et al.

[11] Patent Number: 4,555,755
[45] Date of Patent: Nov. 26, 1985

[54] AC CURRENT CONTROL SYSTEM

[75] Inventors: Ryoichi Kurosawa, Kokubunji; Takeo Shimamura, Hachioji, both of Japan

[73] Assignee: Tokyo Shibaura Denki Kabushiki Kaisha, Kawasaki, Japan

[21] Appl. No.: 589,998

[22] Filed: Mar. 15, 1984

[30] Foreign Application Priority Data

Mar. 16, 1983 [JP] Japan ............................. 58-42349

[51] Int. Cl.$^4$ ........................................... H02P 13/30
[52] U.S. Cl. .................................. 363/160; 363/163; 363/164; 318/803; 318/807
[58] Field of Search ............... 363/159, 160, 164, 165; 318/799, 800, 807, 809

[56] References Cited

U.S. PATENT DOCUMENTS 4,074,348  2/1978  Salzmann et al. .................. 363/160
4,488,215  12/1984  Pfaff et al. ........................... 363/159

FOREIGN PATENT DOCUMENTS 57-52392  3/1982  Japan .

OTHER PUBLICATIONS

C. D. Schauder et al, "Current Control of Voltage Source Inverters for Fast Four-Quadrant Drive Performance", IEEE IAS Annual Meeting, IAS 81:26A, pp. 592-599, (Oct. 1981).

Primary Examiner—William H. Beha, Jr.
Assistant Examiner—Jeffrey Sterrett
Attorney, Agent, or Firm—Schwartz, Jeffery, Schwaab, Mack, Blumenthal & Evans

[57] ABSTRACT

In an AC current control system for controlling multiphase AC currents supplied from a power converter to a load, the currents are detected and coordinate-transformed into orthogonal two-axis current values $i_d$, $i_q$ in a rotating coordinate rotating at an angular frequency $\omega$, and then compared with the references. The deviations are used to determine two-axis voltage values $e_d{}^*$, $e_q{}^*$, which are coordinate-transformed into multi-phase voltage values determining the output voltages of the power converter. The system is characterized in that the voltage value $e_d{}^*$ is determined not only from $\Delta i_d$ but also from the product of $\omega$ and $\Delta i_q$, while the voltage value $e_q{}^*$ is determined not only from $\Delta i_q$ but also from the product of $\omega$ and $\Delta i_d$. This arrangement makes it possible to provide a voltage component corresponding to the voltage drop across the inductive component of the load which is 90° in advance of the current.

3 Claims, 4 Drawing Figures

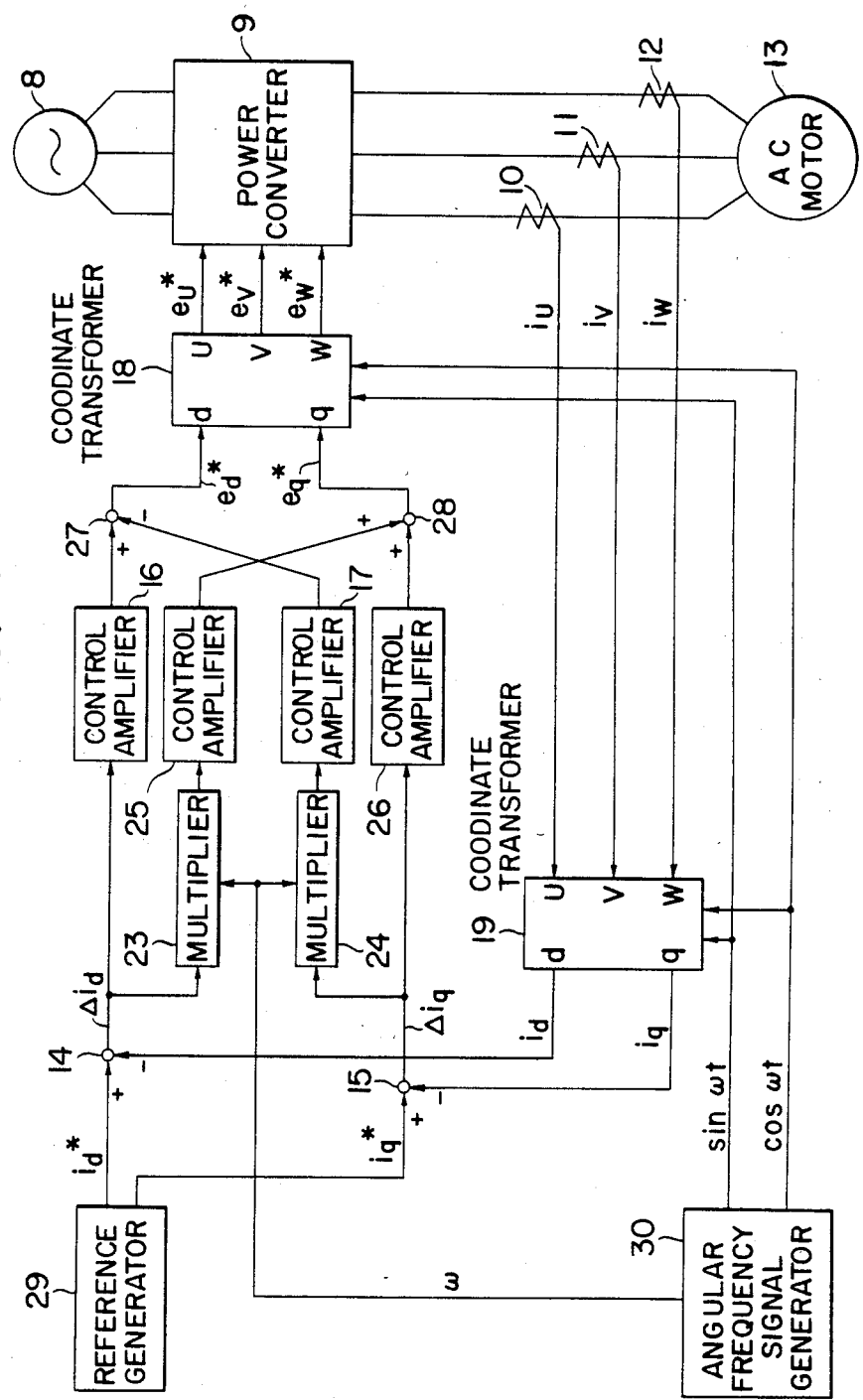
F I G. 4

AC CURRENT CONTROL SYSTEM

BACKGROUND OF THE INVENTION

The present invention relates to an AC current control system for controlling an AC current such as that supplied to a load, e.g., an AC electric motor, by a power converter forming a variable voltage and variable frequency power source.

A variable speed control of an AC motor has been frequently used in which a power converter is used as a power source of an AC electric motor, and the voltage and the frequency are controlled to control the speed of the motor. Particularly, what is called a vector control has been devised in which a current reference which optimizes the response of the AC electric motor is calculated and the output current of the power converter, i.e., the current of the motor is controlled in accordance with the calculated current reference, thereby enabling a control of an AC electric motor with a quick response comparable with that in the control of a DC electric motor. To accomplish the vector control, it is necessary to have the current of the AC motor follow closely (i.e., with a high fidelity) the calculated current reference.

A cyclo-converter incorporating thyristors is known as a large capacity power converter. With a cyclo-converter, the firing of the thyristors must be conducted in synchronism with the phase of the AC power inputted to the cyclo-converter, and a delay is introduced in the switching control. For this delay, the output frequency becomes higher and a delay in phase (phase lag) and an error in the amplitude between the current reference and the actual current are caused.

For a small capacity power converter, a transistor inverter is used. With transistors, a quicker switching control is possible, so that the phase lag is relatively small. But, transistor inverters are used at a higher frequency, so that the phase lag and the amplitude error become problematical.

In a vector control, the current references $i_d^*$, $i_q^*$ along two axes which are orthogonal or in quadrature with each other on a rotating coordinate are calculated and given to a current control device. The two-axis current references $i_d^*$, $i_q^*$ may be considered to correspond or form counterparts of a field current reference and an armature current reference in a control of a DC electric motor, and are given in the form of a DC signal or a quasi-DC signal (consisting of a DC component and/or very low frequency component).

FIG. 1 shows a conventional current control system in which two-axis current references are used. As illustrate the current references $i_d^*$, $i_q^*$ are transformed, by a coordinate transformer 1 into three-phase, i.e., U-phase, V-phase, W-phase, current references $i_u^*$, $i_v^*$, $i_w^*$ which are three-phase sinusoidal signals having an angular frequency $\omega$ of the desired AC current. The AC currents of the respective phases are controlled in accordance with the references $i_u^*$, $i_v^*$, $i_w^*$. The U-phase current reference $i_u^*$ is given by the following expression:

$$i_u^* = i_d^* \cos \omega t + i_q^* \sin \omega t \quad (1)$$

The V-phase current reference $i_v^*$ and the W-phase current reference $i_w^*$ are values having a phase lagging by $2\pi/3$ and $4\pi/3$, respectively.

Actual load currents $i_u$, $i_v$, $i_w$ are detected by current detectors 10, 11, 12 and are compared at the subtractor 2, 3, 4 with the current references $i_u^*$, $i_v^*$, $i_w^*$. The resultant deviations are passed through control amplifiers 5, 6, 7, whose outputs $e_u^*$, $e_v^*$, $e_w^*$ are supplied as voltage references to a power converter 9 converting a power from an AC power source 8 and supplying the converted power to a load in the form of an AC electric motor 13. The power converter 9 is thereby controlled to output voltages in accordance with the voltage references so that the actual load currents are made and maintained equal to the three-phase current references. In general, the control amplifiers 5, 6, 7 are in the form of P-I (proportional plus integral) control amplifiers incorporating a proportional element and an integration element. The gain frequency characteristic $|G(\omega)|$ of each control amplifier is given by the following equation (2).

$$|G(\omega)| = \sqrt{K_P^2 + \frac{K_I^2}{\omega^2}} \quad (2)$$

where
$K_P$ represents a proportion gain, and
$K_I$ represents an integration gain.

For a component of the angular frequency $\omega$ being zero, i.e., the DC component, the gain is the infinity so that no steady-state deviation occurs. For components of larger angular frequencies $\omega$, the overall gain becomes closer to the proportion gain $K_P$ and the steady-state deviation appears in the form of a phase lag and an amplitude error. If the gains $K_P$, $K_I$ are set at large values the steady-state deviation can be made smaller. But the switching control in the power converter has a delay and because of the delay the current control becomes unstable if the gains $K_P$, $K_I$ are set at excessively large values.

To avoid the phase lag and the amplitude error, a current control system as shown in FIG. 2 was contemplated. In this system, three-phase current values $i_u$, $i_v$, $i_w$ in a stationary coordinate are transformed by a coordinate transformer 19 into orthogonal two-axis current values $i_d$, $i_q$ in a rotating coordinate rotating at an angular frequency $\omega$, thereby forming a quasi-DC signals. The values $i_d$, $i_q$ are compared at subtractors 14, 15 with two-axis current reference values $i_d^*$, $i_q^*$ and the differences are passed through control amplifiers 16, 17, whose outputs forming two-axis voltage reference values $e_d^*$, $e_q^*$ area transformed by a coordinate transformer 18 into threephase voltage reference values $e_u^*$, $e_v^*$, $e_w^*$, and are supplied to a power converter 9. The coordinate transformer 18 is similar to the coordinate transformer 1 and the relationship between the inputs and the outputs is similar to that of the equation (1). The relationship between the inputs (the three-phase current values $i_u$, $i_v$, $i_w$) and the outputs (the two-axis current values $i_d$, $i_q$) of the coordinate transformer 19 is shown by the following equations:

$$i_d = i_u \cos\omega t + \frac{i_v - i_w}{\sqrt{3}} \sin\omega t \quad (3)$$

$$i_q = -i_u \sin\omega t + \frac{i_v - i_w}{\sqrt{3}} \cos\omega t \quad (4)$$

If the amplitude of the three-phase currents is I, and the phase of the U-phase current is represented by $\theta$ (the phases of the V-phase current and the W-phase current are lagging by $2\pi/3$, $4\pi/3$ respectively), the three-phase currents are given by the following equations:

$$i_u = I \cos(\omega t + \theta) \quad (5)$$

$$i_v = I \cos(\omega t + \theta - 2\pi/3) \quad (6)$$

$$i_w = I \cos(\omega t + \theta - 4\pi/3) \quad (7)$$

Substituting $i_u$, $i_v$, $i_w$ in these equations for those in the equations (3), (4), we obtain:

$$i_d = I \cos \theta \quad (8)$$

$$i_q = I \sin \theta \quad (9)$$

It is seen that $i_d$, $i_q$ are quasi-DC values which are independent of the angular frequency $\omega$. Thus, the coordinate transformer 19 transforms AC signals in a stationary coordinate into quasi-DC signals in a rotating coordinate, while the coordinate transformer 18 transforms quasi-DC signals in a rotating coordinate into AC signals in a stationary coordinate.

It was expected that since the quasi-DC, two-axis current values $i_d$, $i_q$ are compared with quasi-DC, two-axis current reference values, effect of the angular frequency $\omega$ would be eliminated and the phase lagging and amplitude error would be detected as a DC component, and DC component control by means of the integrating element of the control amplifier would reduce to zero the phase lagging and the amplitude error. However, it has been found that stable control is difficult to achieve. The reason for this is, it is considered, that the control is, in essence, not a true DC control but a control using quasi-DC signals derived by transformation from AC signals.

As an improvement, Japanese Patent Application Laid-open (Kokai) No. 52392/1982 discloses a current control system in which the conventional direct control of the three-phase currents and the abovedescribed quasi-DC control are combined. This is shown in FIG. 3, in which blocks 1–7 are the same as those in FIG. 1, and blocks 14–19 are the same as those in FIG. 2. In addition, adders 20, 21, 22 are provided to add the outputs of the control amplifiers 5, 6, 7 forming part of conventional three-phase current control and the outputs of the coordinate transformer 18 forming part of the quasi-DC control by means of coordinate transformation. It was reported that by the combination of both control features, phase lagging and amplitude error can be eliminated (1980 National Convention Record of Electrical Engineers of Japan, No. 504; published Apr. 2, 1980). But, as will be readily seen, the complicated control circuitry is required. Moreover, to achieve the three-phase current control, which is an AC control, by digital means, such as a microcomputer, the sampling and calculation must be repeated at a rate corresponding to the maximum angular frequency $\omega_M$. Generally, the sampling frequency must be 10 times the maximum frequency $(\omega_M/2\pi)$ of the AC current. If the maximum frequency of the AC current is 100 Hz, the sampling frequency must be in the order of 1 KHz. Such highrate sampling and calculation are practically impossible when a microcomputer is used. In a DC control or a quasi-DC control, the sampling frequency need only be 10 times the maximum frequency of the rate of change of the DC current or the two-axis current values $i_d$, $i_q$. The maximum frequency of the rate of change is generally in the order of 10 Hz, so that the sampling frequency need only be in the order of 100 Hz. As a result, use of a microcomputer for the control amplifiers 16, 17 in FIG. 3 is easy. But even if these circuits are realized by a microcomputer, the circuits 5, 6, 7 for the three-phase current control must be formed of analog circuits or special purpose digital circuits. Thus, simplification of the hardware, improvement in reliability and cost-down of the device were not fully accomplished.

SUMMARY OF THE INVENTION

An object of the invention is to provide an AC current control system which is of simple construction, is capable of stable control, does not require a high frequency sampling and is suitable for implementation by the use of a microcomputer.

According to the invention, there is provided an AC current control system for controlling multiphase AC currents supplied from a power converter to a multiphase load, said system comprising:

current detector means detecting said currents and producing signals indicative of the detected multi-phase current values, first coordinate transformer means transforming the detected multi-phase current values into orthogonal two-axis current values $i_d$ and $i_q$ in a rotating coordinate rotating at an angular frequency $\omega$, means providing two-axis current reference values $i_d^*$ and $i_q^*$, for the current values $i_d$ and $i_q$, means receiving the current values $i_d$ and $i_q$, and the current reference values $i_d^*$ and $i_q^*$, and determining two-axis voltage values $e_d^*$ and $e_q^*$, and second coordinate transformer means transforming the two-axis voltage values $e_d^*$ and $e_q^*$ into multi-phase voltage reference values, said multi-phase voltage reference values being used for determining multi-phase output voltages of the power converter, and said angular frequency $\omega$ being equal or close to an angular frequency of the AC currents, wherein the voltage value $e_d^*$ contains at least a quantity proportional to a first deviation $\Delta i_d$ between the current value $i_d$ and the current reference value $i_d^*$, a quantity proportional to an integral of the first deviation $\Delta i_d$ and a quantity proportional to an integral of a product of the angular frequency $\omega$ and a second deviation $\Delta i_q$ between the current value $i_q$ and the current reference value $i_q^*$, and the voltage value $e_q^*$ contains at least a quantity proportional to the second deviation $\Delta i_q$, a quantity proportional to an integral of the second deviation $\Delta i_q$ and a quantity proportional to an integral of a product of the angular frequency $\omega$ and the first deviation $\Delta i_d$.

BRIEF DESCRIPTION OF THE DRAWINGS

In the accompanying drawings:

FIG. 4 is a block diagram showing an embodiment of the AC current control system according to the invention.

DETAILED DESCRIPTION OF THE PREFERRED EMBODIMENTS

Figure 1:
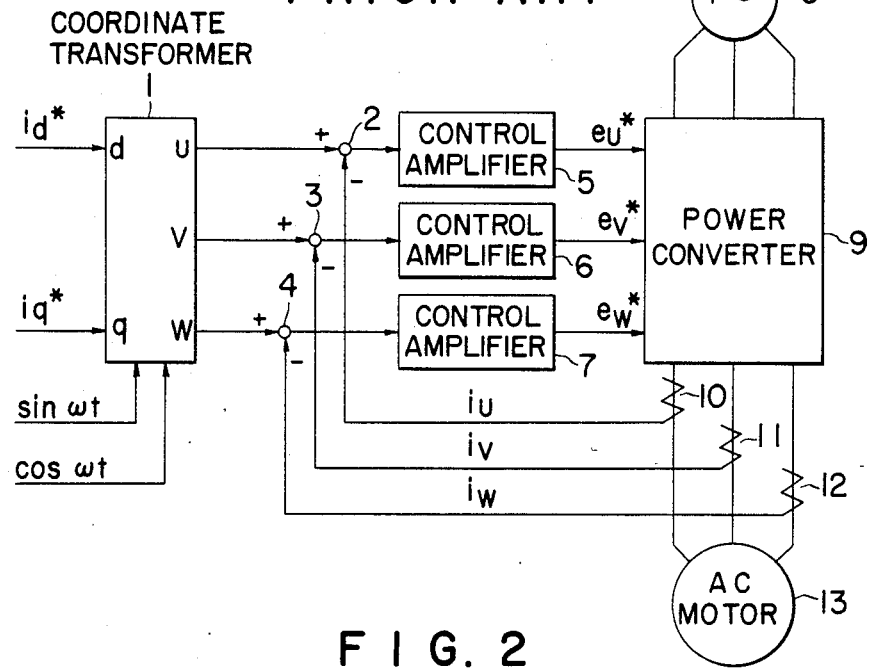
FIGS. 1–3 are block diagrams showing various AC current control systems of the prior art.

FIG. 4 shows an embodiment of an AC current control system according to the invention. Members 8–19 are similar to those in FIG. 1 and FIG. 2 having the same reference numerals. In addition, multipliers 23, 24, control amplifiers 25, 26, a subtractor 27, and an adder 28 are provided. Three-phase current values $i_u$, $i_v$, $i_w$ (in a stationary coordinate) detected by the current detectors 10-12 are transformed by the coordinate transformer 19 into orthogonal two-axis current values $i_d$, $i_q$ in a rotating coordinate rotating at an angular frequency $\omega$, which is for instance identical to the angular frequency of the AC current to be controlled. The current values $i_d$, $i_q$ are compared at the subtractors 14, 15 with two-axis current reference values $i_d^*$, $i_q^*$ in a rotating coordinate which are provided by a reference generator 29, and deviations $\Delta i_d$, $\Delta i_q$ are thereby determined. The deviations $\Delta i_d$, $\Delta i_q$ are control-amplified by the control amplifiers 16, 17, which are PI control amplifiers. They are also fed to the multipliers 23, where they are multiplied by the angular frequency $\omega$. The products are control-amplified by the control amplifiers 25, 26 which are I (integral) control amplifiers. The subtractor 27 subtracts the output of the control amplifier 26 from the output of the control amplifier 16 to produce a d-axis voltage value $e_d^*$. The adder 28 adds the outputs of the control amplifiers 17, 25 to produce a q-axis voltage value $e_q^*$. Thus, the d-axis voltage value $e_d^*$ is or contains the sum of a quantity proportional to $\Delta i_d$, a quantity proportional to a time integral of $\Delta i_d$, and a quantity proportional (with the multiplying coefficient being a negative value) to a time integral of $\Delta i_q$. The q-axis voltage value $e_q^*$ is or contains the sum of a quantity proportional to $\Delta i_q$, a quantity proportional to a time integral of $\Delta i_q$, and a quantity proportional to a time integral of $\Delta i_d$. The two-axis voltage values $e_d^*$, $e_q^*$, which are in the rotating coordinate, are inputted to the coordinate transformer 18, where they are transformed into three-phase voltage reference values $e_u^*$, $e_v^*$, $e_w^*$ in the stationary coordinate. The three-phase voltage reference values are inputted to the power converter 9 for use in control of the output voltage of the power converter.

The signal indicative of $\omega$ used for the multiplication at the multipliers 23, 24 and the signals indicative of sin $\omega t$, cos $\omega t$ used for the coordinate transformation at the coordinate transformers 18, 19 are provided by an angular frequency signal generator 30.

Figure 2:
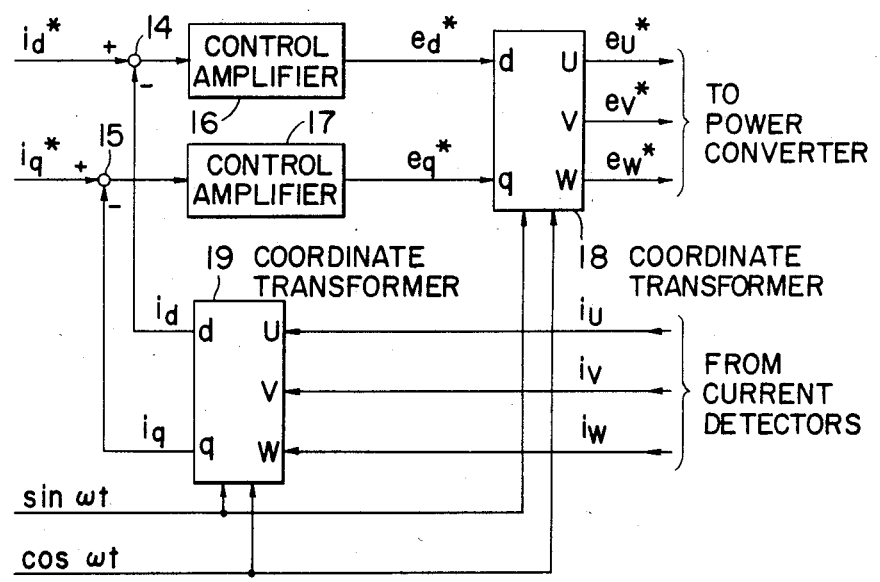
Figure 3:
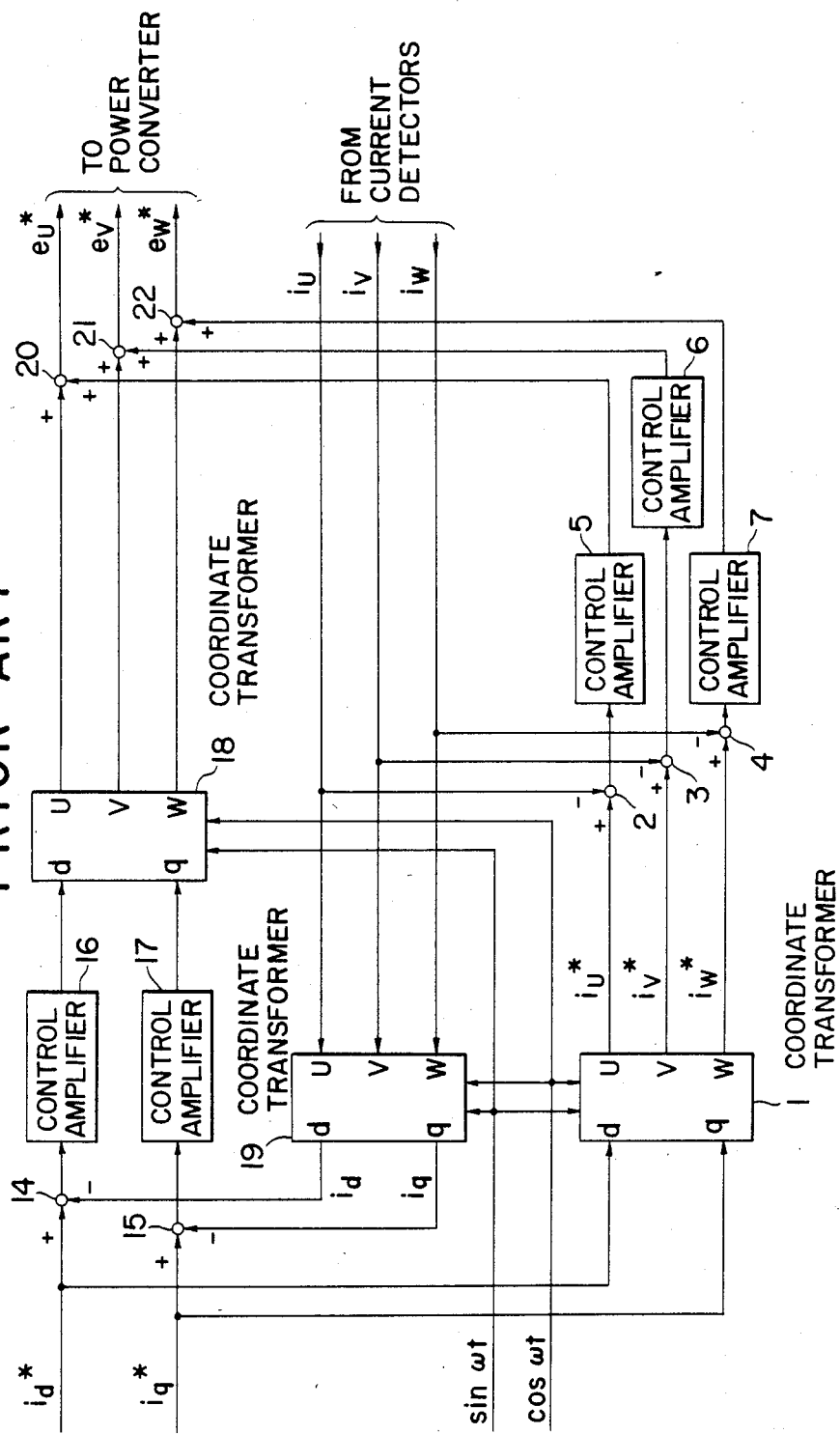

In the prior art system shown in FIG. 2, the d-axis voltage value $e_d^*$ is determined solely from the d-axis deviation $\Delta i_d$, while the q-axis voltage value $e_q^*$ is determined solely from the q-axis deviation $\Delta i_q$. The two-axis components are determined separately from each other.

Usually, loads of the power converter can be regarded as a series circuit of a resistor and an inductor. For controlling a DC current flowing through such a load, PI (proportional plus integral) control amplifier is used which outputs the sum of a quantity proportional to the deviation, i.e., the input and a quantity proportional to an integral of the deviation, i.e., the input. When the current reference value is increased to increase the current, the deviation is increased. The output of the control amplifier is increased in proportion to the increase in the deviation. It is also increased gradually in accordance with the integral of the deviation. The output voltage of the power converter is increased in accordance with the increase in the output of the control amplifier, and the load current is accordingly increased. The increase in the output of the control amplifier and the increase in the output voltage of the power converter are increased until the deviation becomes zero (the detected actual current value equals the current reference value). When the control has become steadystate the current value becomes constant so that there is no voltage drop across the inductive component of the load. This means, the ultimate increase in the output voltage of the power converter corresponds to that part of the voltage drop across the resistive component which is due to the increase in the current. The function of the integral element of the control amplifier is to produce the value of the voltage necessary to make a current of a desired magnitude flow through the load in a steady state.

When an AC current flows through a load of the same series circuit of a resistor and an inductor, and when it is in a steady state, there occur not only a voltage drop across the resistor, but also a voltage drop across the inductor, whose magnitude is related to the magnitude and the frequency of the current and whose phase is 90° ($\pi/2$) in advance of the phase of the current. Thus, for the control of an AC current, it is necessary for the power converter to produce, in a steady state, a voltage component which is proportional to the desired current, as well as a voltage component of a magnitude proportional to the product of the desired current and the angular frequency and of a phase 90° in advance. But where the d-axis voltage value $e_d^*$ is determined solely from the d-axis deviation $\Delta i_d$, and the q-axis voltage value $e_q^*$ is determined solely from the q-axis deviation $\Delta i_q$, only the voltage component which is in phase with the desired current can be produced, and the voltage component 90° in advance cannot be produced. If the d-axis voltage value $e_d^*$ is increased in an attempt to increase the d-axis current component $i_d$, the actual current lags in phase behind $e_d^*$, so that the q-axis current component varies. Thus, there occurs an interference between the d-axis and the q-axis and stable control cannot be attained.

To solve this problem, the invention teaches that the d-axis voltage value $e_d^*$ should be determined from the d-axis deviation $\Delta i_d$ and the q-axis deviation $\Delta i_q$ multiplied by the angular frequency $\omega$, while the q-axis voltage value $e_q^*$ should be determined from the q-axis deviation $\Delta i_q$ and the d-axis deviation $\Delta i_d$ multiplied by the angular frequency $\omega$. When, for instance, the d-axis current reference value $i_d^*$ is increased, the d-axis voltage value $e_d^*$ increases and the q-axis voltage value $e_q^*$ starts increasing. Since the q-axis is 90° in advance of the d-axis, increase of the q-axis voltage would result in the voltage component corresponding to the voltage drop across the inductor of the load which is 90° in advance of the d-axis. When the q-axis current reference value $i_q^*$ is increased, the q-axis voltage value $e_q^*$ increases and the d-axis voltage value $e_d^*$ starts decreasing. Difference between decrease and increase in an AC signal is equivalent to difference of 180° in phase. Therefore, decrease in the d-axis component which lags 90° in phase behind the q-axis component means increase in d-axis (minus d-axis) component 90° in advance of the q-axis component. Thus, a voltage component corresponding to the voltage drop across the inductor of the load is produced by the power converter. The control amplifiers 25, 26 are of I (integral) type, since they are required to produce the voltage component corresponding to the voltage drop which occurs across the inductor of the load in the steady state.

It has been assumed that the angular frequency used for the coordinate transformation is equal to the angular frequency of the AC current. But this is not essential. If the angular frequency used for coordinate transformation is close to the angular frequency of the AC current, the control will be one over a current of a low frequency which is similar to a DC current, so that similar results and advantages are attained.

When the load of the power converter is an AC electric motor, a speed electromotive force is produced in addition to the voltage drop across the resistor and the inductor. To compensate for this, a voltage value in accordance with the speed electromotive force may be added after the adder 27 and the subtractor 28.

The invention has been described as applied to a three-phase system, but is not limited thereto and can be applied to any multi-phase system.

As has been described, according to the invention, the voltage drop across the inductive component of the load is taken into consideration, and the d-axis deviation is used to determine the q-axis voltage value, while the q-axis deviation is used to determine the d-axis component, in a control employing coordinate transformation. By doing so, interference between the d-axis and the q-axis can be prevented and stable control is attained. Thus, control of an AC current is accomplished by the use of simple devices and the stability of control is of the same degree as that of DC current control. Moreover, control of a very quick response is not required, so that sampling need not be at a high rate and microcomputers can be used to implement the substantial part of the control system, including the members 14–17, and 23–28. Therefore, the manufacturing cost of the control system can be lowered, the reliability can be improved and the size of the system can be reduced.

What is claimed is:

1. An AC current control system for controlling multi-phase AC currents supplied from a power converter to a multi-phase load, said system comprising:
   current detector means detecting said currents and producing signals indicative of the detected multi-phase current values,
   first coordinate transformer means transforming the detected multi-phase current values into orthogonal two-axis current values $i_d$ and $i_q$ in a rotating coordinate rotating at an angular frequency $\omega$,
   means providing two-axis current reference values $i_d^*$ and $i_q^*$ for the current values $i_d$ and $i_q$,
   means receiving the current values $i_d$ and $i_q$, and the current reference values $i_d^*$ and $i_q^*$, and determining two-axis voltage values $e_d^*$ and $e_q^*$, and
   second coordinate transformer means transforming the two-axis voltage values $e_d^*$ and $e_q^*$ into multi-phase voltage reference values,
   said multi-phase voltage reference values being used for determining multi-phase output voltages of the power converter, and
   said angular frequency $\omega$ being equal or close to an angular frequency of the AC currents,
   wherein
   the voltage value $e_d^*$ contains at least a first quantity proportional to a first deviation $\Delta i_d$ between the current value $i_d$ and the current reference value $i_d^*$, a second quantity proportional to an integral of the first deviation $\Delta i_d$ and a third quantity proportional to an integral of a product of the angular frequency $\omega$ and a second deviation $\Delta i_q$ between the current value $i_q$ and the current reference value $i_q^*$ and
   the voltage value $e_q^*$ contains at least a fourth quantity proportional to the second deviation $\Delta i_q$, a fifth quantity proportional to an integral of the second deviation $\Delta i_q$ and a sixth quantity proportional to an integral of a product of the angular frequency $\omega$ and the first deviation $\Delta i_d$.

2. A system as set forth in claim 1, wherein the voltage value $e_d^*$ contains a component which is the sum of the first quantity, the second quantity and the third quantity, and the voltage value $e_q$ contains a component which is the sum of the fourth quantity, the fifth quantity and the sixth quantity.

3. A system as set forth in claim 1, wherein said means determining two-axis voltage values comprises:
   means receiving the current value $i_d$ and the current reference value $i_d^*$ and determining the deviation $\Delta i_d$,
   means receiving the current value $i_q$ and the current reference value $i_q^*$ and determining the deviation $\Delta i_q$,
   first control amplifier means (16) of a PI (proportional plus integral) type receiving the first deviation $\Delta i_d$,
   second control amplifier means (17) of a PI type receiving the second deviation $\Delta i_q$,
   first multiplier means multiplying the first deviation $\Delta i_d$ by the angular frequency $\omega$,
   second multiplier means multiplying the second deviation $\Delta i_q$ by the angular frequency $\omega$,
   third control amplifier means (25) of an I (integral) type receiving the output of the first multiplier means,
   fourth control amplifier means (26) of an I type receiving the output of the second multiplier means,
   means (27) determining the difference between the outputs of the first and the fourth control amplifier means to produce the voltage value $e_d^*$, and
   means (28) determining the sum of the outputs of the second and the third control amplifier means to produce the voltage value $e_q^*$.

* * * * *